Figure 3:
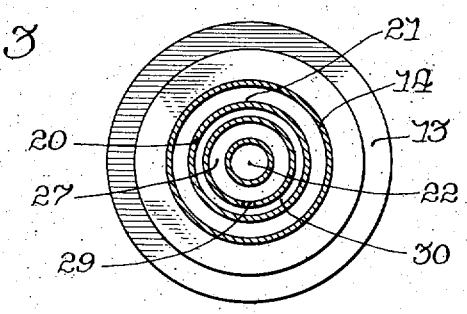

D McR. LIVINGSTON.

CARBURETER.

APPLICATION FILED OCT. 18, 1917.

Reissued Nov. 26, 1918

14,556.

2 SHEETS—SHEET 1.

Inventor
D. McRa Livingston
By Brown, Hanson & Boettcher
Attorneys

D McR. LIVINGSTON.

CARBURETER.

APPLICATION FILED OCT. 18, 1917.

Reissued Nov. 26, 1918.

14,556.

2 SHEETS—SHEET 2.

Inventor
D. McRa Livingston
By Brown, Hanson & Boettcher
Attorneys

UNITED STATES PATENT OFFICE.

D McRA LIVINGSTON, OF NEW YORK, N. Y., ASSIGNOR TO STROMBERG MOTOR DEVICES COMPANY, OF CHICAGO, ILLINOIS, A CORPORATION OF ILLINOIS.

CARBURETER.

14,556. Specification of Reissued Letters Patent. Reissued Nov. 26, 1918.

Original No. 1,112,374, dated September 29, 1914, Serial No. 643,312, filed August 10, 1911. Application for reissue filed October 18, 1917. Serial No. 197,260.

*To all whom it may concern:*

Be it known that I, D McRA LIVINGSTON, a citizen of the United States, and a resident of the city of New York, borough of Manhattan, in the county and State of New York, have invented a new and Improved Carbureter, of which the following is a full, clear, and exact description.

The object of the invention is to provide an improved form of carbureter, which will serve for the production of a proper fuel mixture under all conditions of operation of the engine.

Reference is to be had to the accompanying drawings, forming a part of this specification, in which similar reference characters indicate corresponding parts.

Figure 1:
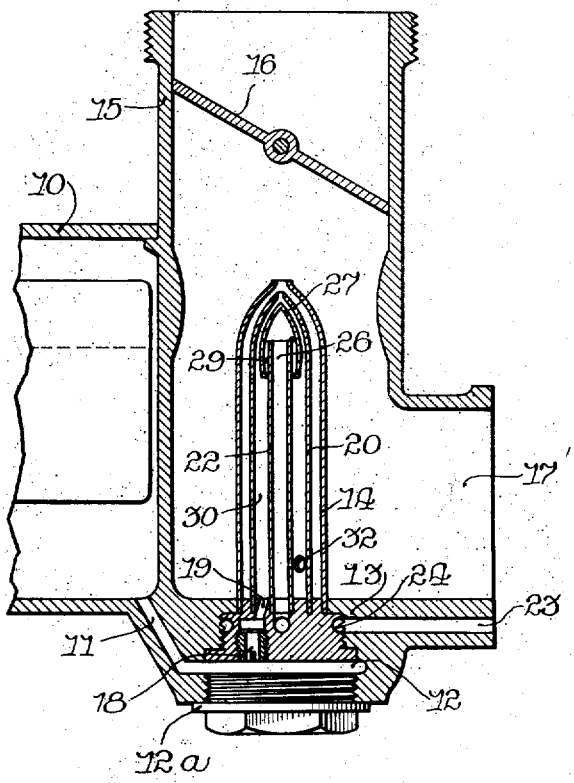
Figure 2:
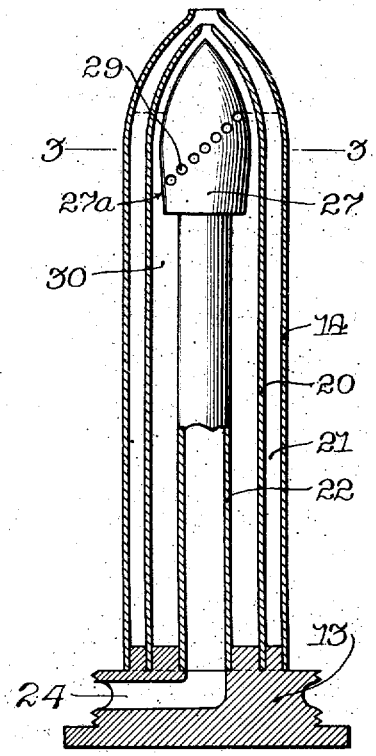
Figure 5:
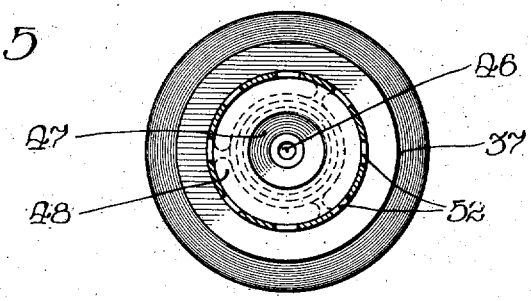
Figure 4:
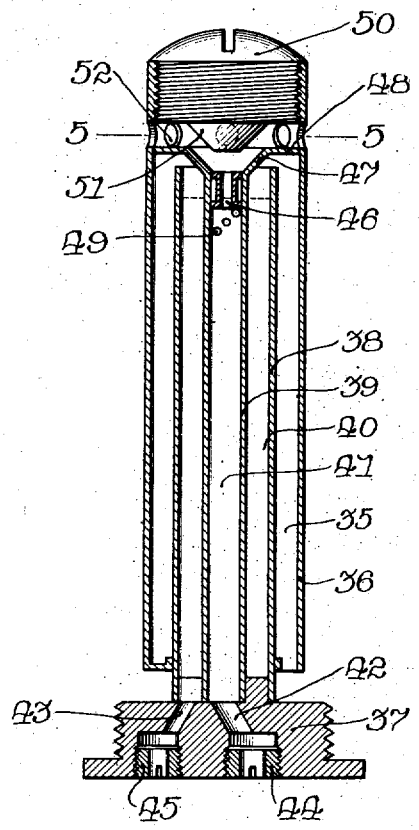

Figure 1 is a sectional elevation of a portion of the carbureter, showing my improved nozzle. Fig. 2 is an enlarged sectional view of the nozzle. Fig. 3 is a horizontal section on approximately the line 3—3, Fig. 2. Fig. 4 is a vertical section of a modified form of nozzle embodying my invention, and Fig. 5 is a horizontal section on line 5—5 of Fig. 4.

My invention may be embodied in any suitable carbureter body 10, having the usual reservoir, connecting as by a passage 11, with the chamber 12, closed by the usual screw plug 12[a], beneath the base plug 13 of the nozzle 14, the said nozzle extending as usual into the mixing tube 15, leading to the engine, the said tube being provided with any approved throttle 16 and air inlet 17.

In the base 13 any suitable regulating plug may be provided, here shown as a single plug 18, having a passage 19 leading to the interior of the nozzle 14. The nozzle proper or main jet of my improved invention is formed by the outer wall of the nozzle and an inner wall 20, providing an intermediate gasolene chamber 21. Within the inner wall 20, an air pipe 22 rises from the base 13 and is supplied with air through any suitable inlet 23 that desirably is connected with the air pipe 22 by the peripheral groove 24 in the base plug 13, and the connecting passage 25 that leads from the peripheral groove to the interior of the air pipe 22, at the base of the latter.

In connection with the air pipe 22, I provide a device whereby the gasolene will form a liquid seal at the outlet end 26 of said air pipe; advantageously this device for the seal may consist of a housing 27, that surrounds the pipe to any desired extent along the length thereof, but preferably only extending a short distance below the top, as clearly shown in Figs. 1 and 2. The housing 27, is preferably closed, except for the provision of an outlet, so formed that more or less air may be drawn from the air pipe 22 and through the housing 27, so that there will be a gradual breaking of the liquid seal and a consequent gradual increase in the amount of air drawn through the nozzle, according to the extent of the vacuum produced by the speed of the engine. Desirably the outlet from the housing may consist of a diagonal series of holes 29, leading outward from the interior of the housing 27, to the space between the said housing and the inner wall 20 of the main jet or nozzle proper. It will be observed that the pipe 22, and its housing 27, form in connection with the inner wall 20, of the main jet, a gasolene chamber 30, constituting a second or auxiliary jet. There may be in practice any suitable means for supplying both the outer jet or nozzle proper and the auxiliary jet or chamber with gasolene. In the present instance there is a single plug 18, leading to the chamber 30, and any suitable opening 32, may be provided in the wall 20, establishing a communication between the inner and outer jets. The regulation at the base, however, need only be approximate, because it will be seen that the described liquid seal for the air pipe and the capacity of the diagonal openings 29, determine the amount of air drawn through the auxiliary jet under high speed. Normally both jets will simply deliver gasolene only when the engine is under slow speed, but upon an increase of the speed, the air will be drawn into the chamber 30 which constitutes the passage between the fuel connection and the outlet of the nozzle of the auxiliary jet or feed device, the air being drawn into said chamber or passage through the air inlets 29 leading thereto, and as these inlets are at different levels, under increasing speed an increasing amount of air will be drawn into the chamber 30 through successive inlets brought under the influence of the suction, to mix with the fuel being drawn upward in the said fuel chamber toward the nozzle outlet. Thus there is a relatively decreasing fuel discharge from the auxiliary nozzle or jet under the suction of increasing engine speed as compared with the main fuel-feed jet, the latter being fully responsive with a relatively increasing fuel discharge.

The dotted line in the gasolene reservoir at the left of Fig. 1 indicates approximately the height of the gasolene in said reservoir, and the gasolene will rise ordinarily to a similar height in the gasolene chambers 21 and 30.

It will be seen that the described automatically regulating nozzle is self-contained, the members being mounted on the plug 13, which can be readily adapted to most forms of carbureters now in use, a slight modification only being necessary to provide the necessary induct for the air to the contained air chamber of the nozzle.

Referring to Figs. 4 and 5, I have shown another form of this nozzle, in which the air chamber 35, is at the exterior of the nozzle instead of the center as in the first described form. Within the outer skirt or depending casing, 36, forming an outer wall of the air chamber 35, there are supported on the base 37, spaced, concentric walls, 38—39, forming concentric gasolene chambers or jets 40—41, provided with separate gasolene ducts, 42—43, controlled by regulating plugs, 44—45. In connection with the casing or wall 39, of the inner chamber or jet, 41, I preferably provide a bushing 46, which reduces or contracts the upper outlet end of the said chamber 41, and I may also provide as shown a deflector 47, said deflector extending from the wall 39 and flaring outwardly and upwardly, above the gasolene chamber 40, the outer edge of the deflector being joined by a horizontal portion 48 to the exterior wall or skirt 36 of the air chamber 35, thus forming a passage between the upper end of the said air chamber and the upper end of the adjacent gasolene chamber 40. Near the upper end of the interior wall 39, said wall is provided with a diagonal series of orifices 49, thereby establishing a communication between the two gasolene chambers or jets, 40—41. Above the outlet end 46 of the chamber 41, a plug 50 may be screwed, provided at its lower end with an inverted, truncated cone 51, disposed opposite to and spaced from the deflector 47 for deflecting and more effectively breaking up the gasolene or mixture issuing from the outlet 46, the mixture finally finding an outlet through holes 52 in the upper end of the nozzle below the screw plug 50 therein.

In operation the gasolene will be taken up by the engine through the outlet 46, without any admixture of air taking place in the nozzle while the engine is running at slow speed. Upon an increase of speed, however, the level of the gasolene in the chamber 40 will be lowered and air will be taken along with the gasolene through the openings 49 in proportion to the increase in the speed.

In both forms of the invention, the air chamber is provided in the nozzle itself, so that the nozzle is self-contained and may be completely inserted in a carbureter, adapted to receive the base plug 13 or 37. In both forms also, the upper end of the air chamber is sealed by the gasolene, under normal or slow speed conditions.

Although the invention is mainly designed to produce a self-contained, automatically controlled nozzle, functioning without adventitious air or fuel chambers for governing the suction control of the air supply under high speeds, it will be obvious that in some of its aspects, the invention is not limited to a self-contained nozzle.

To prevent a too sudden breaking of the liquid seal of the air chamber the housing 27 or the next adjacent wall, 21, or both, may be formed out of parallelism, as by tapering the housing as at 27ª, Fig. 2. In this way the suction, after partially breaking the liquid seal, will have a less pronounced effect in drawing in the air, owing to the gradually increased widening of the throat or space between the housing and the adjacent wall.

Having thus described my invention, I claim as new, and desire to secure by Letters Patent:

1. A carbureter nozzle comprising a suction controlled jet, the passageway of which is of constant size regardless of suction, and a stationary air duct extending into the nozzle and having a suction controlled fuel seal at its outlet end within the nozzle, the sealed area of the said outlet of the air duct decreasing with the extent of the suction exerted on the nozzle.

2. In a carbureter, a carbureting chamber having a mixture outlet and an air inlet of constant size regardless of suction, a constant level liquid fuel chamber, a fuel inlet for said carbureting chamber, an auxiliary fuel chamber fed from said constant level liquid fuel chamber through a passageway of constant size regardless of suction and feeding said fuel inlet, said auxiliary fuel chamber having air admissible thereto, and a plurality of passageways through each of which air may pass to the fuel inlet, said passageways being normally sealed by the liquid fuel in said auxiliary fuel chamber but being successively unsealed as the level of liquid in said auxiliary fuel chamber descends.

3. In a carbureter, a carbureting chamber having a mixture outlet and main air inlet means of constant size regardless of suction and a fuel feed device extending into said carbureting chamber and having a fuel connection of constant size regardless of suction, an outlet, a fuel passage from the fuel connection to the outlet, and air inlets leading to the said fuel passage at different levels between the fuel connection and the outlet, the said air inlets being normally sealed, under low speeds, by the fuel.

4. In a carbureter, a main fuel feed device and an auxiliary fuel feed device, each having a fuel connection, an outlet, and a fuel passage from the fuel connection to the outlet, and the auxiliary feed device having air inlets leading to the fuel passage thereof at different levels between the fuel connection and the outlet, the said air inlets being normally sealed by the fuel at low speeds and admitting air in succession under high speeds.

5. In a carbureter, a carbureting chamber having a mixture outlet and main air inlet means, a constant level liquid fuel chamber, a fuel feed device having a connection with said liquid fuel chamber of constant size regardless of suction, an outlet above the established liquid level, a fuel passage from the fuel connection to the outlet, and an auxiliary fuel chamber associated with said fuel passage, and having holes leading into said fuel passage at different levels below said liquid fuel level, air being admissible to said chamber and said holes successively permitting the passage of air into said fuel passage as the fuel level in said auxiliary fuel chamber lowers in response to suction on said outlet.

6. In a carbureter, a carbureting chamber having a mixture outlet and main air inlet means of constant size regardless of suction, a constant level liquid fuel chamber, a fuel feed device having a connection with said liquid fuel chamber of constant size regardless of suction, an outlet above the established liquid level, a fuel passage from the fuel connection to the outlet, and an auxiliary fuel chamber associated within said fuel passage and having holes leading into said fuel passage at different levels below said liquid fuel level, air being admissible to said chamber and said holes successively permitting the passage of air into said fuel passage as the fuel level in said auxiliary fuel chamber lowers in response to suction on said outlet.

7. In a carbureter, a carbureting chamber having a mixture outlet and an air inlet of constant size regardless of suction, a constant level liquid fuel chamber, a fuel inlet for said carbureting chamber, an auxiliary fuel chamber fed from said constant level liquid fuel chamber through a passageway of constant size regardless of suction and feeding said fuel inlet, said auxiliary fuel chamber having air admissible thereto, and a plurality of passageways through each of which air may pass to the fuel inlet, the liquid fuel in said auxiliary fuel chamber by sealing action and by its level determining the number of said passageways through which such air passes.

In witness whereof, I hereunto subscribe my name this 18th day of August, A. D. 1917.

D McRA LIVINGSTON.